(12) United States Patent  (10) Patent No.: US 11,829,550 B2
Sun  (45) Date of Patent: Nov. 28, 2023

(54) TOUCH DISPLAY SCREEN AND DISPLAY APPARATUS

(71) Applicant: BOE Technology Group Co., Ltd., Beijing (CN)

(72) Inventor: Xuefei Sun, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/508,883

(22) Filed: Oct. 22, 2021

(65) Prior Publication Data

US 2022/0300137 A1  Sep. 22, 2022

(30) Foreign Application Priority Data

Mar. 16, 2021 (CN) .......................... 202110281189.6

(51) Int. Cl.
*G06F 3/041* (2006.01)
*G06F 3/044* (2006.01)
*G02F 1/1333* (2006.01)
*G02F 1/1335* (2006.01)

(52) U.S. Cl.
CPC ...... *G06F 3/04164* (2019.05); *G02F 1/13338* (2013.01); *G02F 1/133528* (2013.01); *G06F 3/0412* (2013.01); *G06F 3/0446* (2019.05); *G02F 2201/38* (2013.01)

(58) Field of Classification Search
None
See application file for complete search history.

(56) References Cited

U.S. PATENT DOCUMENTS

| | | | |
|---|---|---|---|
| 2015/0227237 A1* | 8/2015 | Ono | G06F 3/0445 |
| | | | 345/174 |
| 2016/0034077 A1* | 2/2016 | Hsieh | G02F 1/13338 |
| | | | 345/173 |
| 2019/0346943 A1* | 11/2019 | Kim | G06F 3/0443 |
| 2020/0012387 A1* | 1/2020 | Kim | G06F 3/04164 |

* cited by examiner

*Primary Examiner* — Christopher R Lamb
(74) *Attorney, Agent, or Firm* — IPro, PLLC

(57) ABSTRACT

A touch display screen is disclosed. The touch module in the touch display screen includes: touch electrodes and touch trace lines. The touch trace lines are all disposed along an edge of the display region. At least part of the touch trace lines include: a first sub trace line and a second sub trace line connected with the first sub trace line. The first sub trace line is in the protrusion sub-region, and the second sub trace line extends to the display region and is electrically connected with the touch electrodes in the display region. An included angle between the first sub trace line and the second sub trace line is greater than 0. An included angle between an angle bisector of the included angle and a weak light leakage direction of the anti-reflection layer is smaller than or equal to 15 degrees.

18 Claims, 3 Drawing Sheets

TOUCH DISPLAY SCREEN AND DISPLAY APPARATUS

CROSS REFERENCE TO RELATED APPLICATIONS

This disclosure is based on and claims priority under 35 U.S.C 119 to Chinese Patent Application No. 202110281189.6, filed on Mar. 16, 2021, in the China National Intellectual Property Administration. The entire disclosure of the above application is incorporated herein by reference.

FIELD

The disclosure relates to the technical field of display, in particular to a touch display screen and a display apparatus.

BACKGROUND

With the rapid development of a display technology, touch screen panels have been commonly used in people's lives. At present, on cell touch panels have become the mainstream trend of touch products due to the advantages of being thinner to facilitate thinning a product body. Restricted by product requirements such as flexible folding and narrow bezels, organic light-emitting diode (OLED) touch display products mostly use a flexible multi-layer on cell (FMLOC) technology to design touch structures. The FMLOC technology refers to the production of a metal grid electrode layer on a packaging layer of a display panel to perform touch control without an external touch screen panel.

SUMMARY

Embodiments of the disclosure provide a touch display screen and a display apparatus.

Embodiments of the disclosure provides a touch display screen, including: a display panel, a touch module on a light emitting side of the display panel, and an anti-reflection layer on a side, facing away from the display panel, of the touch module. The touch display screen includes: a display region, and a bezel region located outside the display region, wherein the bezel region has a protrusion sub-region protruding towards the display region. The touch module includes: a plurality of touch electrodes and a plurality of touch trace lines; the plurality of touch electrodes are located in the display region, and the plurality of touch trace lines are all disposed along an edge of the display region. At least part of the touch trace lines include: a first sub trace line and a second sub trace line connected with the first sub trace line. The first sub trace line is located in the protrusion sub-region, and the second sub trace line extends from the protrusion sub-region to the display region and is electrically connected with the touch electrodes; and an included angle between the first sub trace line and the second sub trace line is greater than 0, and an included angle between an angle bisector of the included angle between the first sub trace line and the second sub trace line and one weak light leakage direction of the anti-reflection layer is smaller than or equal to 15 degrees.

Embodiments of the disclosure provide a display apparatus, including a touch display screen. The touch display screen includes: a display panel, a touch module on a light emitting side of the display panel, and an anti-reflection layer on a side, facing away from the display panel, of the touch module. The touch display screen includes: a display region, and a bezel region located outside the display region, wherein the bezel region has a protrusion sub-region protruding towards the display region. The touch module includes: a plurality of touch electrodes and a plurality of touch trace lines; the plurality of touch electrodes are located in the display region, and the plurality of touch trace lines are all disposed along an edge of the display region. At least part of the touch trace lines include: a first sub trace line and a second sub trace line connected with the first sub trace line. The first sub trace line is located in the protrusion sub-region, and the second sub trace line extends from the protrusion sub-region to the display region and is electrically connected with the touch electrodes; and an included angle between the first sub trace line and the second sub trace line is greater than 0, and an included angle between an angle bisector of the included angle between the first sub trace line and the second sub trace line and one weak light leakage direction of the anti-reflection layer is smaller than or equal to 15 degrees.

BRIEF DESCRIPTION OF THE DRAWINGS

In order to more clearly illustrate the technical solutions in the embodiments of the disclosure, a brief description will be given below with reference to the drawings that need to be used in the description of the embodiments. Obviously, the drawings in the description below are only some embodiments of the disclosure, and it would have been obvious for those ordinary skilled in the art to obtain other drawings according to these drawings without involving any inventive effort.

DETAILED DESCRIPTION

Figure 1:
FIG. 1 is a schematic structural diagram of a touch display screen according to embodiments of the disclosure.

In order to make the objectives, technical solutions, and advantages of the embodiments of the disclosure clearer, the technical solutions of the embodiments of the disclosure will be clearly and fully described in combination with the accompanying drawings of the embodiments of the disclosure. It is apparent that the described embodiments are some, but not all, embodiments of the disclosure. Also, embodiments and features in the embodiments of the disclosure may be combined with one another without conflict. Based on the described embodiments of the disclosure, all other embodiments attainable by those ordinary skilled in the art without involving any inventive effort are within the scope of the disclosure.

Unless otherwise defined, the technical terms or scientific terms used in the disclosure shall have the usual meanings understood by those with ordinary skills in the field to which the disclosure belongs. "First", "second" and similar words used in the disclosure do not indicate any order, quantity or importance, but are only used to distinguish different components. "Comprise" or "include" or other similar words mean that an element or item appearing before the word covers elements or items listed after the word and their equivalents, but does not exclude other elements or items. "Connecting" or "connected" or other similar words are not limited to physical or mechanical connections, but may include electrical connections, whether direct or indirect.

It should be noted that the dimensions and shapes of the various figures in the drawings are not to scale and are intended to be merely illustrative of the disclosure. The same or similar reference numerals refer to the same or similar elements or elements having the same or similar functions throughout.

At present, in a display apparatus such as a mobile phone that adopts a full screen, in order to realize the functions of selfie, a video call, and fingerprint recognition, a front camera, an earpiece, a fingerprint recognition region or physical buttons are usually set on the front of the display apparatus. In the related art, in order to achieve full-screen display, an OLED touch display screen includes a display region and a bezel region. The bezel region has a protrusion sub-region towards to the display region to allow the display region to have a notch, and devices such as the camera and the earpiece are disposed in the protrusion sub-region. A touch structure is located in the display region, however, due to the high reflectivity of a metal layer in the touch structure, an anti-reflection polarizer of the OLED touch display screen cannot meet the requirements of a full viewing angle, and especially the anti-reflection effect in the oblique azimuth direction is little. Consequently, under certain viewing angles, the metal layer in the touch structure may cause Mura phenomenon at the edge of the protrusion sub-region, which influences the display effect.

Figure 2:
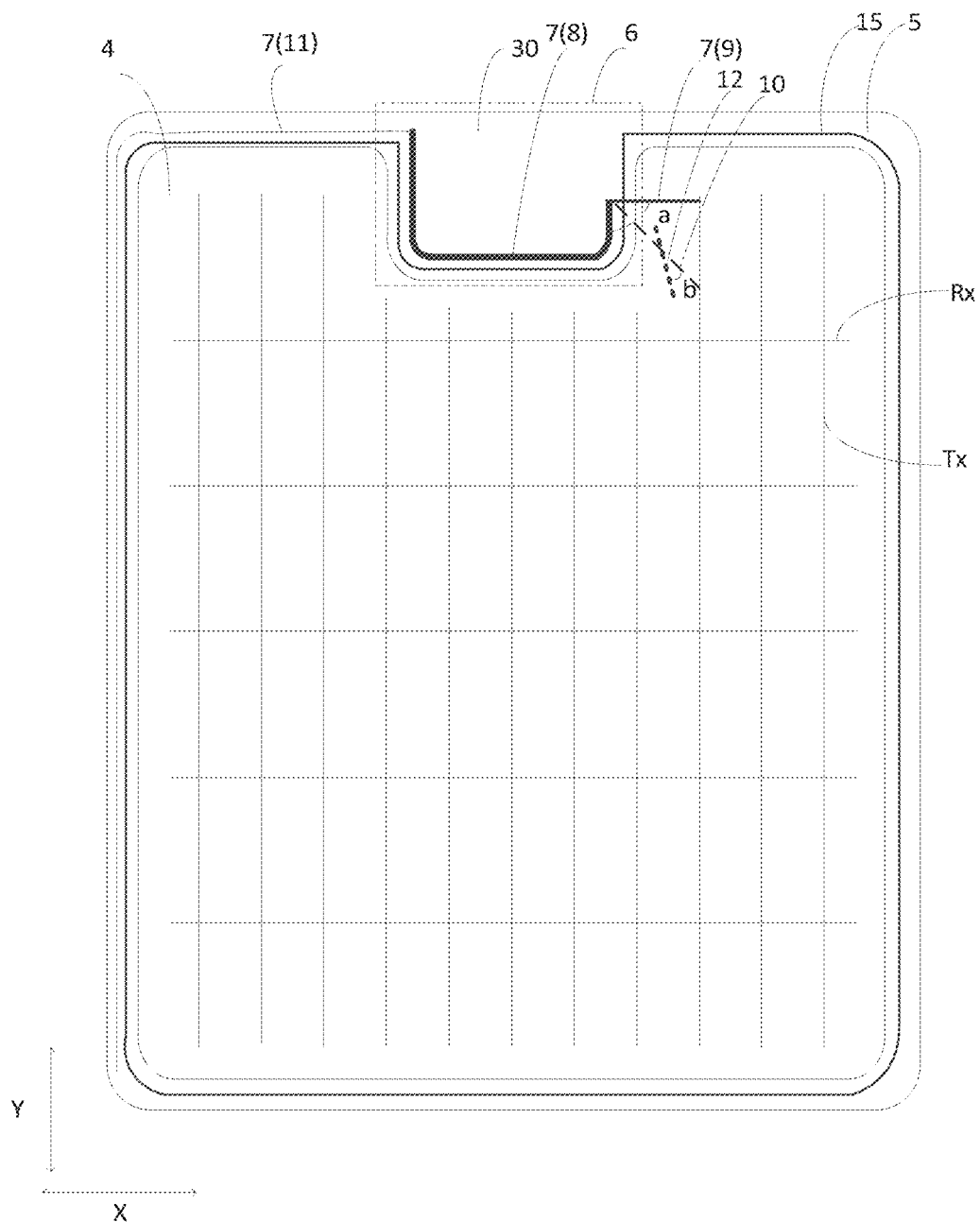
FIG. 2 is a top view of a touch display screen according to embodiments of the disclosure.

Embodiments of the disclosure provide a touch display screen. As shown in FIG. 1, the touch display screen includes: a display panel 1, a touch module 2 disposed on a light emitting side of the display panel 1, and an anti-reflection layer 3 disposed on a side, facing away from the display panel 1, of the touch module 2. As shown in FIG. 2, the touch display screen includes: a display region 4, and a bezel region 5 outside the display region 4. The bezel region 5 has a protrusion sub-region 6 protruding towards the display region 4.

The touch module includes: a plurality of touch electrodes (Tx and Rx) and a plurality of touch trace lines 7. The plurality of touch electrodes (Tx and Rx) are located in the display region 4, and the plurality of touch trace lines 7 are all disposed along the edge of the display region 4.

At least part of the touch trace lines 7 include: a first sub trace line 8 and a second sub trace line 9 connected with the first sub trace line 8.

The first sub trace line 8 is located in the protrusion sub-region 6, and the second sub trace line 9 extends to the display region 4 from the protruding sub-region 6 and is electrically connected with the touch electrodes.

An included angle a between the first sub trace line 8 and the second sub trace line 9 is greater than 0, and an included angle b between an angle bisector 10 of the included angle a between the first sub trace line 8 and the second sub trace line 9 and one weak light leakage direction 12 of the anti-reflection layer is smaller than or equal to 15 degrees.

It should be noted that the protrusion sub-region corresponds to the Notch region of the display region. In some embodiments, devices such as a camera and an earpiece may be disposed in the protrusion sub-region.

In some embodiments, the Notch region may be located at the top of the touch display screen, that is, the protrusion sub-region 6 is disposed at the top side of the display region 4. Of course, the Notch region may also be located in other positions of the touch display screen, which is not limited here.

In the touch display screen according to the embodiments of the disclosure, the included angle between the angle bisector of the included angle between the first sub trace line located in the protrusion sub-region and the second sub trace line extending to the display region from the protrusion sub-region and the weak light leakage direction of the anti-reflection layer is smaller than or equal to 15 degrees, thus the weak light leakage direction of the anti-reflection layer matches the corner angle of touch trace lines located in and near the protrusion sub-region, which improves the anti-reflection effect of the anti-reflection layer and avoids the Mura phenomenon caused by strong reflection at corners of the trace lines. The display effect can be improved, and the user experience can be enhanced.

In some embodiments, as shown in FIG. 2, the plurality of touch electrodes include a plurality of touch drive electrodes Tx and a plurality of touch sensing electrodes Rx arranged crosswise. The plurality of touch drive electrodes Tx are generally arranged in a first direction X and extend in a second direction Y, and the plurality of touch sensing electrodes Rx are generally arranged in the second direction Y and extend in the first direction X. Of course, the plurality of touch drive electrodes Tx may also be arranged in the second direction Y and extend in the first direction X, and the plurality of touch sensing electrodes Rx may also be arranged in the first direction X and extend in the second direction Y, which is not limited here. In some embodiments, the touch electrodes may be, for example, a grid shape electrode.

In some embodiments, each touch trace line is configured to provide a driving signal for the corresponding touch electrode or to receive a sensing signal on the corresponding touch electrode.

In the related art, at the corner where the first sub trace line and the second sub trace line are connected, the trace line made of metal reflect light, which causes the Mura phenomenon.

In some embodiments, as shown in FIG. 2, the touch module further includes: a ground trace line 15 to avoid static.

In some embodiments, the ground trace line may be disposed in a different layer from the touch trace lines. Of course, the ground trace line may also be disposed in the same layer as the touch trace lines, and at this case, the ground trace line is interrupted by the second sub trace line.

It should be noted that only one touch trace line 7 is shown in FIG. 2 for illustration. Moreover, not all touch trace lines need to extend from the protrusion sub-region to the display region. In some embodiments, the quantity of the touch trace lines may be set according to the quantity of rows and columns of the touch electrodes. In FIG. 2, the touch trace line further includes a third sub trace line 11 electrically connected with the first sub trace line. It should be noted that the third sub trace line 11 shown in FIG. 2 is only a part but not complete, and the third sub trace line 11 is electrically connected with a driving chip (not shown).

Figure 3:
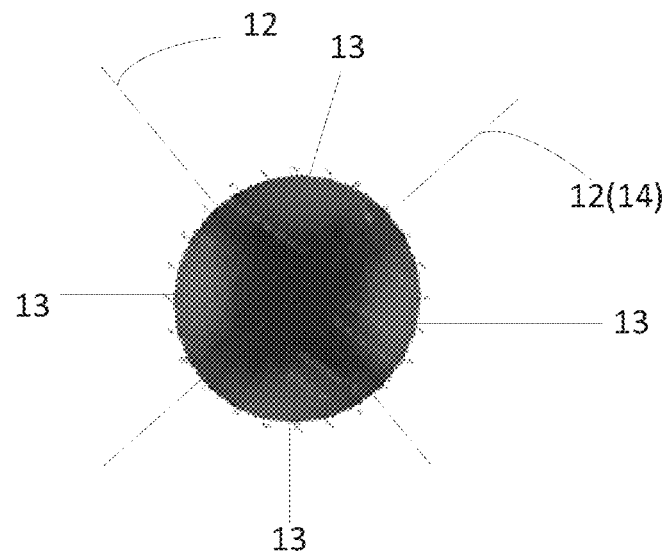
FIG. 3 is a schematic diagram of a weak light leakage direction of an anti-reflection layer according to embodiments of the disclosure.

It should be noted that, as shown in FIG. 3, regions 13 represent strong light leakage regions of the anti-reflection layer, and the boundaries of the regions 13 represent the weak light leakage directions 12 of the anti-reflection layer. FIG. 3 shows two weak light leakage directions 12 of the anti-reflection layer, one of the weak light leakage directions 12 coincides with an absorption axis 14 of the anti-reflection layer, and the other weak light leakage direction 12 is perpendicular to the absorption axis 14.

It can be understood that the aforementioned weak light leakage direction 12 is any direction which points from the center of the circle to the outside in weak light leakage regions between the plurality of strong light leakage regions, and the weak light leakage directions 12 may approximately coincide with or may not completely coincide with the absorption axis 14.

In some embodiments, when the anti-reflection layer is provided, after a direction of the angle bisector of the included angle between the first sub trace line and the second sub trace line is determined, the included angle between the absorption axis of the anti-reflection layer and the angle bisector may be set to be smaller than or equal to 15 degrees, or, the included angle between the weak light leakage direction perpendicular to the absorption axis of the anti-reflection layer and the angle bisector may be set to be smaller than or equal to 15 degrees.

In some embodiments, in different touch trace lines, the included angles between the first sub trace lines and the second sub trace lines are the same.

In some embodiments, in different touch trace lines, the included angles between the angle bisectors of the included angles between the first sub trace lines and the second sub trace lines and the weak light leakage directions of the anti-reflection layer are the same. That is, in the different touch trace lines, the included angle between the angle bisector of the included angle and the weak light leakage direction of the anti-reflection layer is smaller than or equal to 15 degrees. As such, the weak light leakage direction of the anti-reflection layer matches the corner angle of each touch trace line located in and near the protrusion sub-region, which improves the anti-reflection effect of the anti-reflection layer, and avoids the Mura phenomenon caused by strong reflection at the corners of the trace lines. The display effect can be improved, and the user experience can be enhanced.

Figure 4:
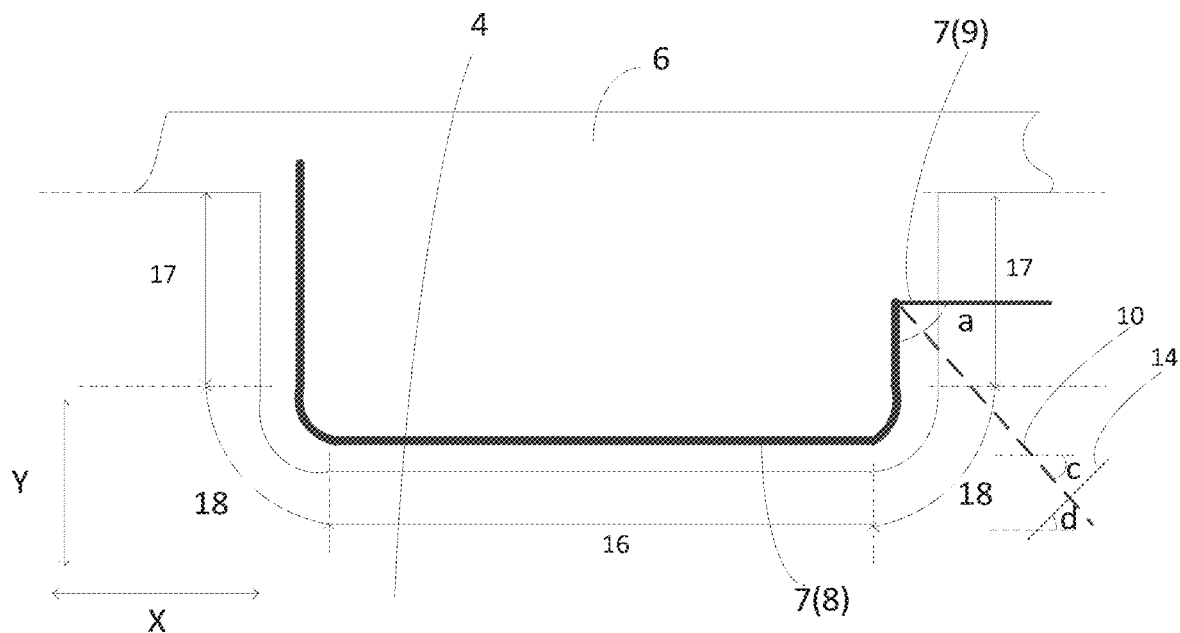
FIG. 4 illustrates an enlarged view of a protrusion sub-region of a touch display screen according to embodiments of the disclosure.
Figure 5:
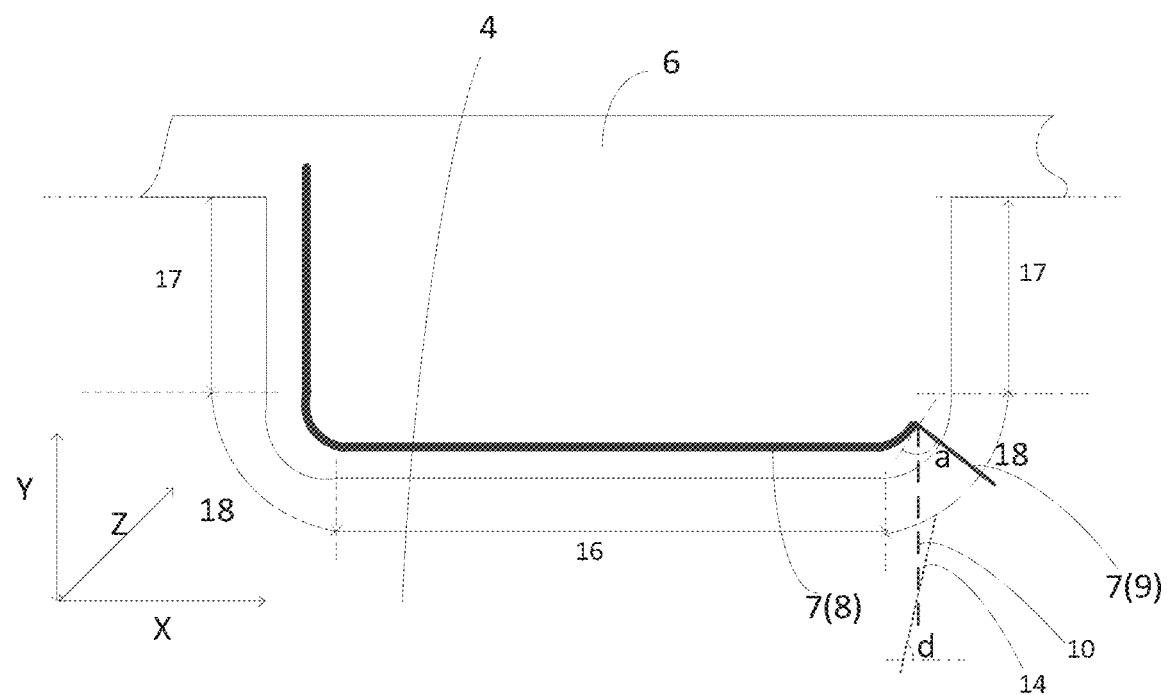
FIG. 5 illustrates an enlarged view of a protrusion sub-region of another touch display screen according to embodiments of the disclosure.

In some embodiments, as shown in FIGS. 4 and 5, the boundary close to the display region 4, of the protrusion sub-region 6 includes: a first part 16 extending in the first direction X, second parts 17 respectively disposed at the two sides of the first part 16 and extending in the second direction Y, and arc parts 18 respectively disposed at the two sides of the first part 16 and connecting the first part 16 with the second parts 17. The arc parts 18 bulge towards the display region 4.

The first sub trace line 8 is at least parallel to the first part 16.

In some embodiments, as shown in FIG. 4, the second sub trace line 9 extends in the first direction X, and an orthographic projection of the second sub trace line 9 on the display panel and an orthographic projection of the corresponding second part 17 have an overlapping area.

That is, in the touch display screen according to the embodiments of the disclosure, the second sub trace line extends from the protrusion sub-region to the display region crossing the second parts. Therefore, the design and wiring difficulty of the touch display screen can be simplified, and the manufacturing difficulty of the corner between the first sub trace line and the second sub trace line can be reduced.

In some embodiments, as shown in FIG. 4, an included angle c between the angle bisector 10 of the included angle between the first sub trace line 8 and the second sub trace line 9 and the first direction is 45 degrees.

As shown in FIG. 4, the first sub trace line 8 further includes parts parallel to the second parts 17 and connected with the second sub trace line 9. The included angle between the second sub trace line 9 and the first sub trace line 8 connected with the second sub trace line 9 is 90 degrees.

In some embodiments, the included angle between the weak light leakage direction perpendicular to the absorption axis of the anti-reflection layer and the angle bisector 10 may be set to be smaller than or equal to 15 degrees. In this case, as shown in FIG. 4, an included angle d between the absorption axis 14 of the anti-reflection layer and the first direction X is 30 degrees to 60 degrees.

Alternatively, in some embodiments, an included angle between the absorption axis of the anti-reflection layer and the angle bisector 10 may be set to be smaller than or equal to 15 degrees. In this case, the included angle d between the absorption axis 14 of the anti-reflection layer and the first direction X is 120 degrees to 150 degrees.

It should be noted that the included angle d between the absorption axis and the first direction X refers to an included angle between the section of absorption axis disposed above a straight line parallel to the first direction X and the straight line.

In some embodiments, as shown in FIG. 5, the second sub trace line 9 extends in a third direction Z. Neither an included angle between the third direction Z and the first direction X nor an included angle between the third direction Z and the second direction Y is 0. The orthographic projection of the second sub trace line 9 on the display panel and an orthographic projection of the arc part 18 have an overlapping area.

That is, in the touch display screen according to the embodiment of the disclosure, the second sub trace line extends from the protrusion sub-region to the display region crossing the arc part.

In some embodiments, as shown in FIG. 5, the angle bisector 10 of the included angle a between the first sub trace line 8 and the second sub trace line 9 is parallel to the second direction Y.

In the touch display screen according to the embodiments of the disclosure, the angle bisector of the included angle between the first sub trace line and the second sub trace line is parallel to the second direction. Compared to the case that the angle bisector and the second direction have an included angle therebetween, the anti-reflection layer may be further prevented from leaking light in a corner region, which further improves the display effect.

As shown in FIG. 5, the first sub trace line 8 further includes parts parallel to the arc parts 18 and connected with the second sub trace line 9. An included angle between the second sub trace line 9 and a tangent line of the first sub trace line 8 connected with the second sub trace line 9 is 90 degrees.

In some embodiments, as shown in FIG. 5, the included angle between the absorption axis of the anti-reflection layer and the angle bisector 10 may be set to be smaller than or equal to 15 degrees. In this case, the included angle d between the absorption axis 14 of the anti-reflection layer and the first direction X is 75 degrees to 105 degrees.

Alternatively, in some embodiments, the included angle between the weak light leakage direction perpendicular to the absorption axis of the anti-reflection layer and the angle bisector may be set to be smaller than or equal to 15 degrees. In this case, the included angle d between the absorption axis of the anti-reflection layer and the first direction X is 0 to 15 degrees or 165 degrees to 180 degrees.

It should be noted that the included angle d between the absorption axis and the first direction X refers to the included angle between the section of the absorption axis disposed above the straight line parallel to the first direction X and the straight line.

It should be noted that the solutions provided in FIGS. 4 and 5 in which the touch trace lines extend from the protrusion sub-region to the display region are just for exemplifying how to make the anti-reflection layer match the corner angle of the touch trace lines located in and near the protrusion sub-region. The position where the touch trace lines extend from the protrusion sub-region to the display region may be selected according to actual needs.

In some embodiments, the angle bisector of the included angle between the first sub trace line and the second sub trace line is perpendicular to the absorption axis of the anti-reflection layer. Therefore, the anti-reflection effect of the anti-reflection layer can be further improved, the Mura phenomenon caused by strong reflection at the corner of the trace lines can be avoided, the display effect can be improved, and the user experience can be enhanced.

In some embodiments, the anti-reflection layer includes: an anti-reflection polarizer.

In some embodiments, the anti-reflection polarizer specifically includes: pressure sensitive adhesive (PSA), a viewing angle compensation layer, a retarder layer, PSA, an octadearyl dimethyl ammonium chloride (OTAC) layer, a polyvinyl alcohol (PVA) layer, a tricarboxylic acid cycle (TAC) layer, an HCTAC layer sequentially stacked on the side, facing away from the display panel, of the touch module. Among them, PVA determines the weak light leakage direction of the anti-reflection polarizer, that is, the weak light leakage direction of PVA needs to match the direction of the angle bisector of the included angle between the first sub trace line and the second sub trace line.

In some embodiments, in the touch display screen according to the embodiments of the disclosure, the display panel includes an OLED display substrate and a packaging layer disposed on a light emitting side of the OLED display substrate. The touch module is disposed on the packaging layer. The OLED display substrate includes a base substrate and a display function layer disposed on the base substrate. The display function layer generally includes a pixel circuit array and an OLED array disposed on the pixel circuit array. The packaging layer covers the display function layer.

Embodiments of the disclosure provide a display apparatus, including the touch display screen according to the embodiment of the disclosure.

The display apparatus according to the embodiments of the disclosure is: any product or component with a display function such as a mobile phone, a tablet computer, a television, a display, a notebook computer, a digital photo frame and a navigator. Other essential components of the display apparatus will be understood by those ordinary skilled in the art and are not described in detail herein and are not intended to limit the disclosure. The implementation of the display apparatus may be seen in the above-mentioned embodiment of the touch display screen, which will not be repeated.

Based on the touch display screen and the display apparatus according to the embodiments of the disclosure, the included angle between the angle bisector of the included angle between the first sub trace line located in the protrusion sub-region and the second sub trace line extending from the protrusion sub-region to the display region and the weak light leakage direction of the anti-reflection layer is smaller than or equal to 15 degrees, so that the weak light leakage direction of anti-reflection layer matches the corner angle of the touch trace lines located in and near the protrusion sub-region, which improves the anti-reflection effect of the anti-reflection layer, and avoids the Mura phenomenon caused by strong reflection at the corners of the trace lines. The display effect can be improved, and the user experience can be enhanced.

It will be apparent to those skilled in the art that various modifications and variations can be made in the disclosure without departing from the spirit or scope of the disclosure. Thus, it is intended that the disclosure cover the modifications and variations of the disclosure provided they come within the scope of the appended claims and their equivalents of the disclosure.

The invention claimed is:

1. A touch display screen, comprising:
   a display panel;
   a touch module on a light emitting side of the display panel; and
   an anti-reflection layer on a side, facing away from the display panel, of the touch module;
   wherein the touch display screen has a display region, and a bezel region outside the display region, wherein the bezel region has a protrusion sub-region protruding towards the display region; wherein the anti-reflection layer comprises: an anti-reflection polarizer;
   wherein the touch module comprises: a plurality of touch electrodes and a plurality of touch trace lines, wherein the plurality of touch electrodes are located in the display region, and the plurality of touch trace lines are all disposed along an edge of the display region;
   at least part of the touch trace lines comprise: a first sub trace line and a second sub trace line connected with the first sub trace line;
   the first sub trace line is located in the protrusion sub-region, and the second sub trace line extends from the protrusion sub-region to the display region and is electrically connected with the touch electrodes;
   the anti-reflection layer has two weak light leakage directions, one of the two weak light leakage directions coincides with an absorption axis of the anti-reflection layer, and the other weak light leakage direction is perpendicular to the absorption axis of the anti-reflection layer; and
   an included angle between the first sub trace line and the second sub trace line is 90 degrees, and an included angle between an angle bisector of the included angle between the first sub trace line and the second sub trace line and the weak light leakage direction coinciding with the absorption axis of the anti-reflection layer is smaller than or equal to 15 degrees.

2. The touch display screen according to claim 1, wherein for different touch trace lines, the included angles between the first sub trace lines and the second sub trace lines are same.

3. The touch display screen according to claim 2, wherein a boundary close to the display region, of the protrusion sub-region comprises:
   a first part extending in a first direction;
   second parts respectively disposed at two sides of the first part and extending in a second direction; and
   arc parts respectively disposed at the two sides of the first part and connecting the first part with the second parts, and the arc parts bulge towards the display region;
   wherein the first sub trace line is at least parallel to the first part.

4. The touch display screen according to claim 3, wherein the second sub trace line extends in the first direction, and an orthographic projection of the second sub trace line on the display panel and an orthographic projection of a corresponding second part of the boundary on the display panel have an overlapping area.

5. The touch display screen according to claim 4, wherein an included angle between the angle bisector of the included angle between the first sub trace line and the second sub trace line and the first direction is 45 degrees.

6. The touch display screen according to claim 5, wherein an included angle between an absorption axis of the anti-reflection layer and the first direction is 30 degrees to 60 degrees.

7. The touch display screen according to claim 3, wherein the second sub trace line extends in a third direction, and an orthographic projection of the second sub trace line on the display panel and an orthographic projection of a corresponding arc part on the display panel have an overlapping area; and
    neither an included angle between the third direction and the first direction nor an included angle between the third direction and the second direction is 0.

8. The touch display screen according to claim 7, wherein the angle bisector of the included angle between the first sub trace line and the second sub trace line is parallel to the second direction.

9. The touch display screen according to claim 8, wherein an included angle between an absorption axis of the anti-reflection layer and the first direction is 75 degrees to 105 degrees.

10. A display apparatus, comprising a touch display screen, wherein the touch display screen comprises:
    a display panel;
    a touch module on a light emitting side of the display panel; and
    an anti-reflection layer on a side, facing away from the display panel, of the touch module;
    wherein the touch display screen has a display region, and a bezel region outside the display region, wherein the bezel region has a protrusion sub-region protruding towards the display region; wherein the anti-reflection layer comprises: an anti-reflection polarizer;
    wherein the touch module comprises: a plurality of touch electrodes and a plurality of touch trace lines, wherein the plurality of touch electrodes are located in the display region, and the plurality of touch trace lines are all disposed along an edge of the display region;
    at least part of the touch trace lines comprise: a first sub trace line and a second sub trace line connected with the first sub trace line;
    the first sub trace line is located in the protrusion sub-region, and the second sub trace line extends from the protrusion sub-region to the display region and is electrically connected with the touch electrodes;
    the anti-reflection layer has two weak light leakage directions, one of the two weak light leakage directions coincides with an absorption axis of the anti-reflection layer, and the other weak light leakage direction is perpendicular to the absorption axis of the anti-reflection layer; and
    an included angle between the first sub trace line and the second sub trace line is 90 degrees, and an included angle between an angle bisector of the included angle between the first sub trace line and the second sub trace line and the weak light leakage direction coinciding with the absorption axis of the anti-reflection layer is smaller than or equal to 15 degrees.

11. The display apparatus according to claim 10, wherein for different touch trace lines, the included angles between the first sub trace lines and the second sub trace lines are same.

12. The display apparatus according to claim 11, wherein a boundary close to the display region, of the protrusion sub-region comprises:
    a first part extending in a first direction;
    second parts respectively disposed at two sides of the first part and extending in a second direction; and
    arc parts respectively disposed at the two sides of the first part and connecting the first part with the second parts, and the arc parts bulge towards the display region;
    wherein the first sub trace line is at least parallel to the first part.

13. The display apparatus according to claim 12, wherein the second sub trace line extends in the first direction, and an orthographic projection of the second sub trace line on the display panel and an orthographic projection of a corresponding second part of the boundary on the display panel have an overlapping area.

14. The display apparatus according to claim 13, wherein an included angle between the angle bisector of the included angle between the first sub trace line and the second sub trace line and the first direction is 45 degrees.

15. The display apparatus according to claim 14, wherein an included angle between an absorption axis of the anti-reflection layer and the first direction is 30 degrees to 60 degrees.

16. The display apparatus according to claim 12, wherein the second sub trace line extends in a third direction, and an orthographic projection of the second sub trace line on the display panel and an orthographic projection of a corresponding arc part on the display panel have an overlapping area; and
    neither an included angle between the third direction and the first direction nor an included angle between the third direction and the second direction is 0.

17. The display apparatus according to claim 16, wherein the angle bisector of the included angle between the first sub trace line and the second sub trace line is parallel to the second direction.

18. The display apparatus according to claim 17, wherein an included angle between an absorption axis of the anti-reflection layer and the first direction is 75 degrees to 105 degrees.

\* \* \* \* \*